UNITED STATES PATENT OFFICE.

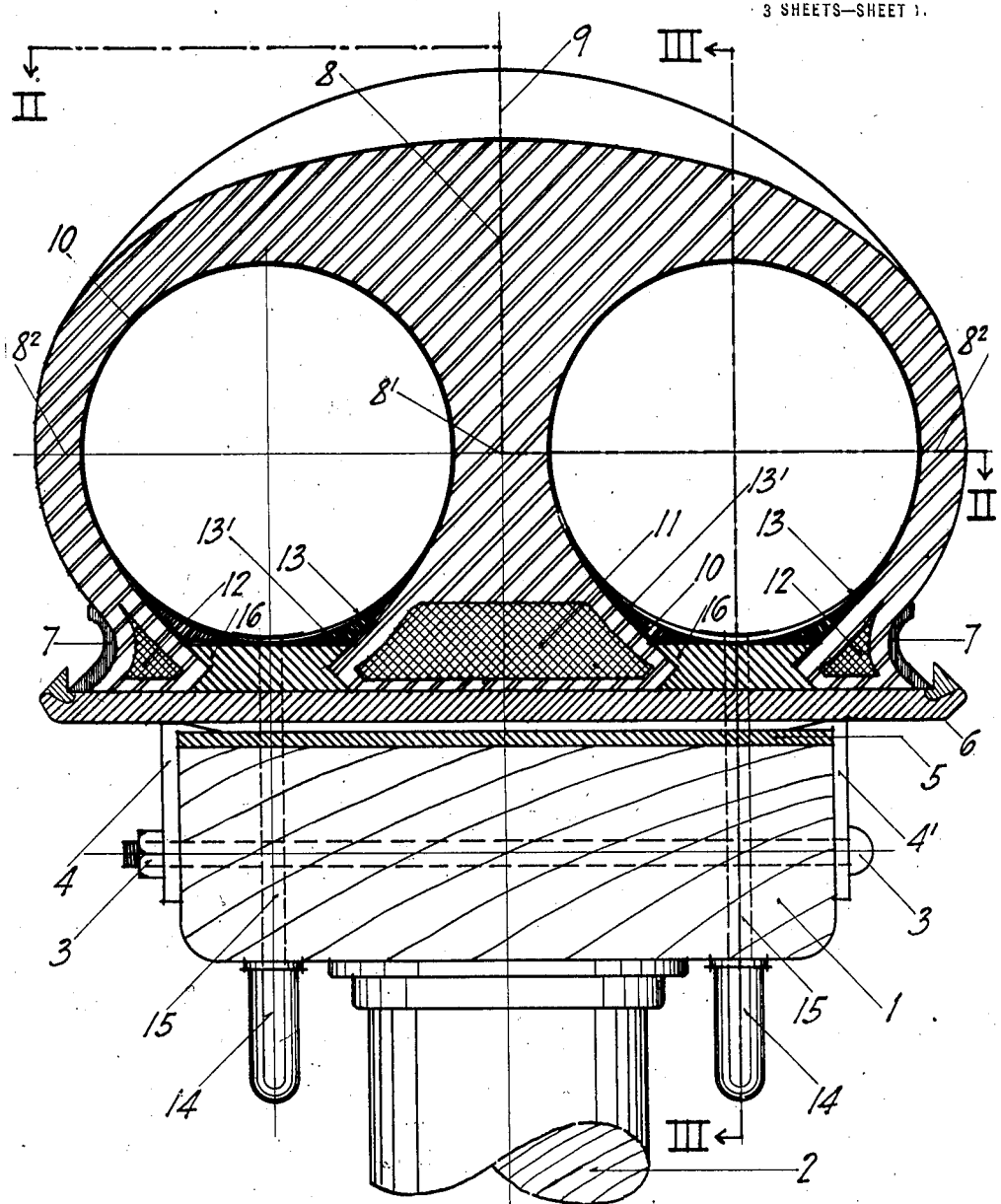
FIG. I

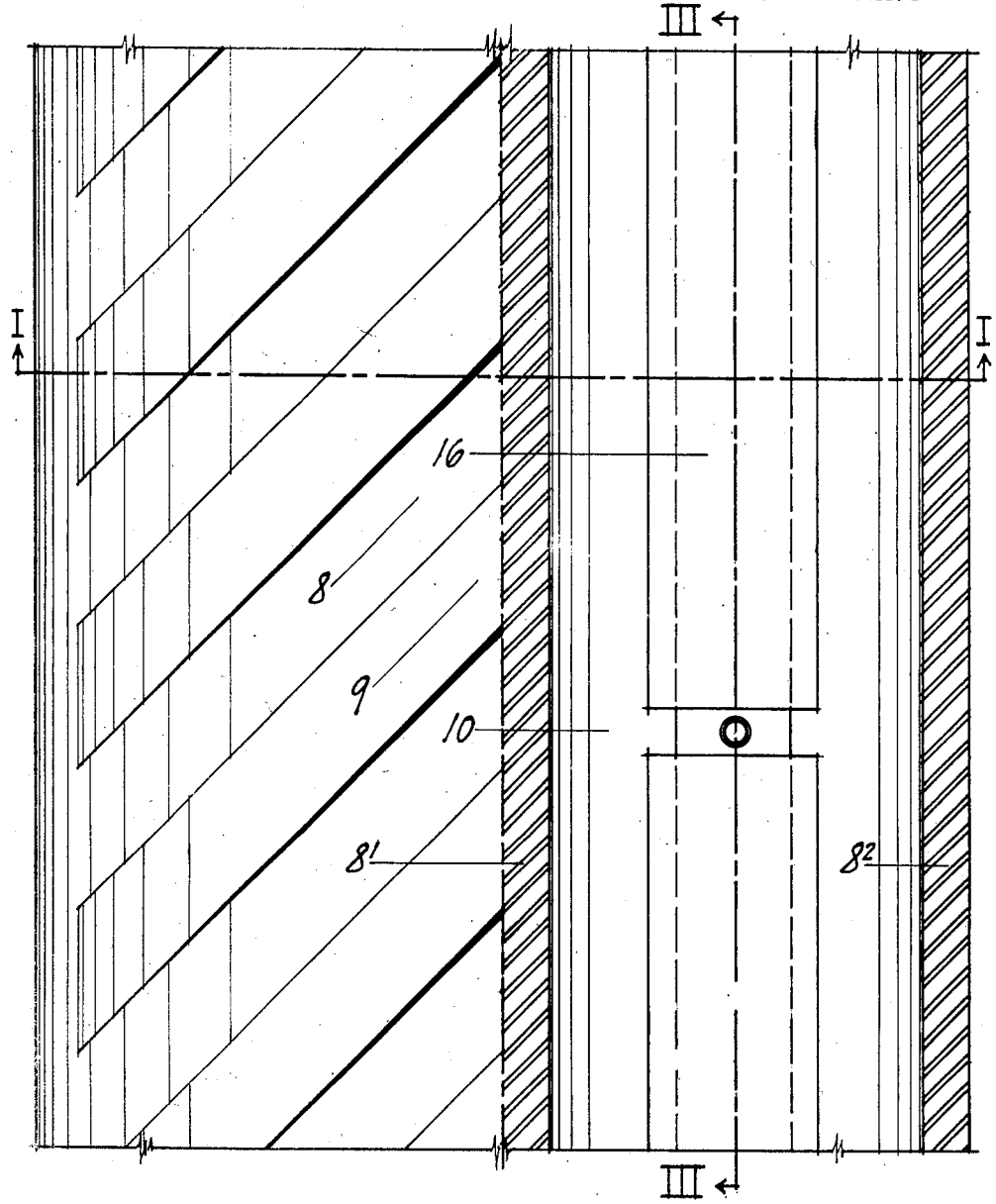
FIG. II

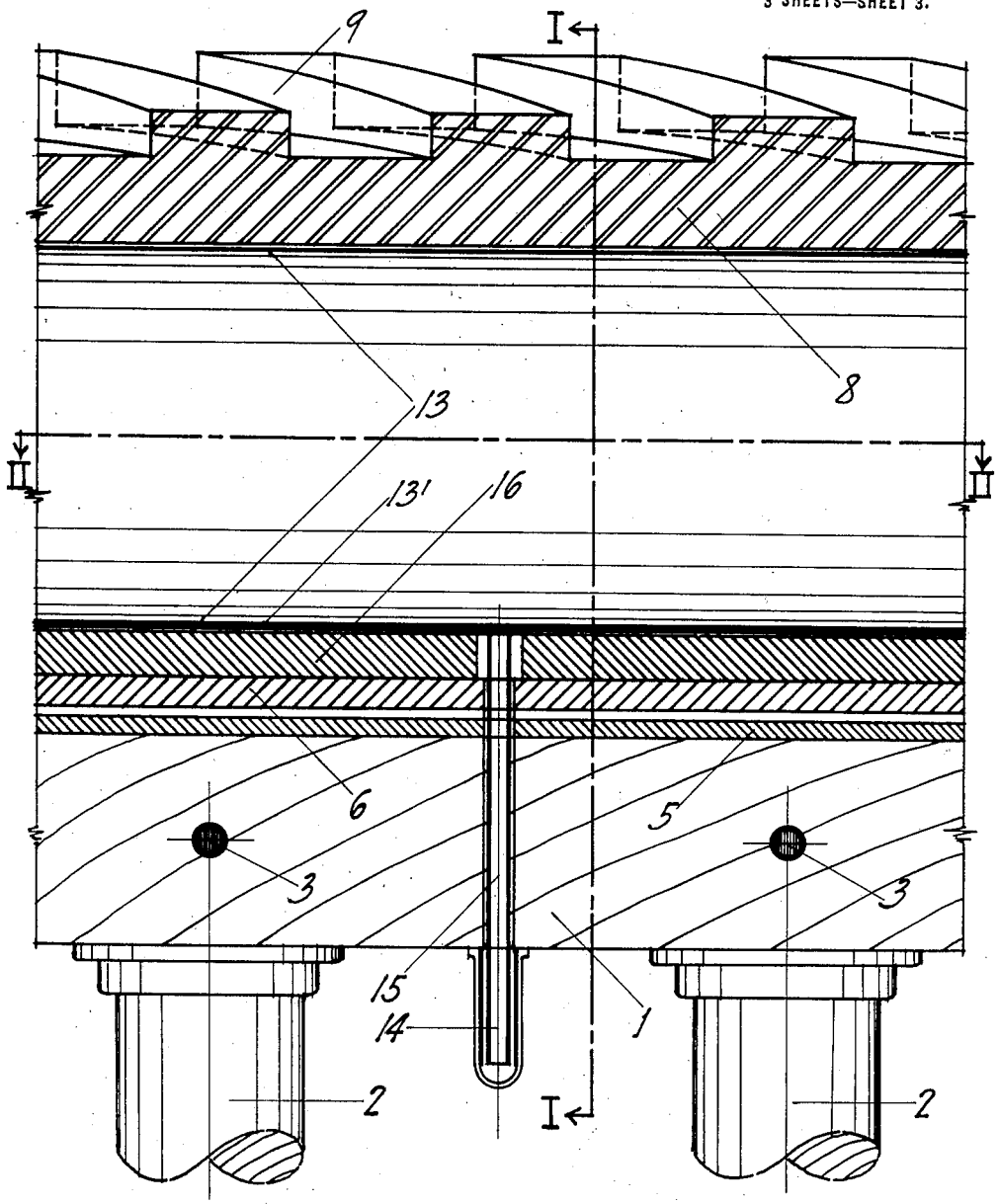
FIG. III

PETER T. LEHR, OF NEW YORK, N. Y.

PNEUMATIC TIRE.

1,404,532.  Specification of Letters Patent.  Patented Jan. 24, 1922.

Application filed November 1, 1920. Serial No. 420,996.

*To all whom it may concern:*

Be it known that I, PETER T. LEHR, a citizen of the United States, and resident of New York, in the county of New York and State of New York, have invented a certain new and useful Pneumatic Tire, of which the following is a specification, the same being a full, clear, and exact description of the invention, such as will enable others skilled in the art to which it appertains to make and use the same.

This invention relates to an improvement in elastic tires adapted for use with automotive or other vehicles, the same being equally well adapted, under proper conditions of construction, to be employed with wheels of light vehicles as well as with those of heavy-duty trucks, which tire has been designed and is made in such a manner as to secure the maximum strength and resiliency with the employment of a minimum quantity of rubber.

One object of the invention is to provide an elastic tire which will give an increased road traction, increased resiliency, and aid in forming a practically solid supporting bed in places where such a structure is desirable, as in sandy roads; besides, by the uneven tread face thereof, preventing skidding and obviating any tendency to slip on wet streets having smooth face composition pavements.

Another object of the invention is to provide an improved construction of pneumatic tires which is massive in structure—the major pressure being on a comparatively wide area—and which possesses a high degree of elasticity or resiliency, and wherein the stress is widely distributed along the surface of the pneumatic member, and in which the disadvantages of the solid tire, or of the pneumatic tire, as ordinarily made, are eliminated.

A further object of the invention is to provide an improved means for reinforcing the base portion of the tire whereby the same will be rigidly secured on and sustained by, and also prevented from being pulled out of engagement with, the rim of the wheel, and to furnish an efficient mode of quickly securing the tire to the wheel in a simple and inexpensive manner and of readily removing the same therefrom at will.

In short, the invention has for its object the production of a better and more practicable form of tire and to avoid in the same certain defects and objectionable features which are met in tires of this class as heretofore made, and which shall be simple in construction, inexpensive to manufacture and efficient in practical use.

With these objects and purposes, and others which will be hereinafter pointed out, in view; the invention consists in certain novel features of construction, combination, arrangement and operation of parts as hereinbelow set forth.

In the drawings, illustrative of one embodiment of the invention, which accompany and form a part of this specification, Figure 1 represents a transverse section of a tire constructed according to my invention;

Figure 2 is a plan view, and view in section taken on the line II—II, Figure 1; and Figure 3 is a vertical section on the line III—III, Figure 1.

Referring particularly and in detail to the drawings, in which is illustrated a portion of a wheel equipped with my invention, the numeral 1 denotes a felloe and 2 the spokes of the wheel, which elements, together with the tire securing devices, may be of any desired or approved construction.

The said felloe may have a bolt 3 constructed and arranged to hold in position the wedged clamps 4 and 4', and to also carry a metal rim 5. The said bolt is preferably so constructed as to allow the clamp 4 to be removed without displacing the clamp 4' in cases where the same may be deemed to be necessary or desirable.

Upon the said rim may be mounted tire retaining means as a preferably steel channel 6 and a continuous or preferably split locking ring 7 serving as a preferred mode of producing a tire securing means, although, manifestly, other, and in fact any, suitable tire attaching means may be employed, depending upon the particular structure of the wheel used and also upon whether the tire is of the straight side or clencher type.

In order to securely hold the parts in proper working position I preferably use a suitable number of split metal rings or bands 16 having inner and outer peripheral concave or V-shaped grooves adapted to be respectively engaged with the base of the pier 8' of the tire and also with the inner portions of the outer retaining walls $8^2$ of the said tire as is clearly shown in the drawings, the lower portions of the pier 8' and retaining walls 8² preferably being made, in the present instance, with coacting devices to engage and co-operate with the wheel retaining means 7 and 16.

By the use of the split rings 16 (formed with laterally grooved engaging means) and the outside locking rings 7 an aligned gripping device is secured, all of the said rings co-operating to constitute three pairs of aligned clamping jaws, whereby the pier and side walls of the tire are rigidly interlocked and securely held to the rim.

The unitary rubber tire or shoe 8 may be made with a plurality of preferably parallel and adjacent longitudinal channels 10 and an intermediate preferably solid pier 8' and outer retaining walls 8². The lower parts of the said longitudinal channels made with annular circumferential openings 10' which allow the pneumatic tubes 13 to pass therethrough, are preferably reduced in width.

The tire may be made of any suitable resilient material and the lower portion of the pier 8' may have preferably interior reinforcing means 11, as of hard rubber, fibre, or other approved strengthening material, and at the base of the walls 8² may be positioned preferably similar and aligned reinforcing means as at 12.

These reinforcing members, by which the upper part of the tire is rendered more resilient than the lower portion thereof, are preferably made so as to be smaller in width at the top than at the bottom thereof.

The bottom portions of the pier 8' and retaining walls 8² are preferably positioned in alignment or in the same plane, while the wearing tread face is preferably made with uneven portions as by being formed with cavities or preferably V-shaped recesses 9 in order to afford better traction and superior antiskid properties.

In the two longitudinal channels 10 of the tire, I insert the inner member comprising in the present instance tubes 13 which are adapted to be inflated in the usual manner thus providing a pair of pneumatic members. The employment of the said tubes is preferably accompanied with the use of adjacent protecting pads or filler rings 13' which may lie on the inner clamping rings 16 to support the said tubes 13. Obviously a greater number of pneumatic inner tubes may be employed, if desired. Air tubes may extend from the pneumatic tubes 13 and may pass through the felloe 1 and may be equipped with the ordinary valve 15 and valve cap 14.

By the construction described, a strong and resilient tire is provided having a broad and practically solid tread, while the stress is directed along the surfaces of the inner tubes, and in case one of the latter should become deflated, the other tube and the protection afforded by the pier and the outer retaining walls will allow the tire to be used for a considerable distance without injury and until the inoperative tube can be replaced.

From the foregoing description, taken in connection with the accompanying drawings, the construction and operation of the invention will be readily understood without a more extended explanation.

I wish it to be understood that I do not desire to be limited to the particular use or the exact details of construction shown and described, for obvious modifications will occur to persons skilled in the art.

What I claim as my invention is:—

1. In a device of the class described, a rim, a tire body having a pair of pneumatic members comprising two longitudinal channels to form an integral centre pier and side walls the said channels being open at the rim, rings in said openings having oppositely disposed clamping jaws to grasp the outer faces of the pier, the other edges of said rings being also formed with clamping jaws, and rings on the outside of the tire body to co-operate with the last named clamping jaws to grasp the opposite faces of the side walls, all of said clamping jaws being aligned, whereby all of said parts at the inner face of the tire may be rigidly clamped together by the rim.

2. In a device of the class described, a rim, a tire body having a pair of pneumatic members comprising two longitudinal channels to form an integral centre pier and side walls the said channels being open at the rim, rings in said openings having oppositely disposed concave clamping jaws to grasp the outer faces of the pier, the other edges of said rings being also formed with similar clamping jaws, and rings on the outside of the tire body having convex inner faces to co-operate with the last named clamping jaws to grasp the opposite faces of the side walls, all of said clamping jaws being aligned, whereby all of said parts at the inner face of the tire may be rigidly clamped together by the rim.

3. In a device of the class described, a rim having securing means, a tire body having a pair of pneumatic members comprising two longitudinal channels to form an integral centre pier and side walls the said channels being open at the rim, rings in said openings having oppositely disposed clamping jaws to grasp the outer faces of the pier, the other edges of said rings being also formed with clamping jaws, and rings on the outside of the tire body to co-operate with the last named clamping jaws to grasp the opposite faces of the side walls and also to engage the securing means of the rim, all of said clamping jaws being aligned, whereby all of said parts at the inner face of the tire may be rigidly clamped together by the rim.

4. In a device of the class described, a rim, a tire body having a pair of pneumatic members comprising two longitudinal channels to form an integral centre pier and side walls the said channels being open at the rim, rings in said openings having oppositely disposed clamping jaws to grasp the outer faces of the pier, the other edges of said rings being also formed with clamping jaws, and rings on the outside of the tire body to co-operate wth the last named clamping jaws to grasp the opposite faces of the side walls, all of said clamping jaws being aligned, whereby all of said parts at the inner face of the tire may be rigidly clamped together by the rim, the interior portions of the walls and pier being reinforced with stiffening material between all of the clamping jaws to impart greater solidity to the structure.

5. In a device of the class described, a rim, a tire body having a pair of pneumatic members comprising two longitudinal channels to form an integral centre pier and side walls the said channels being open at the rim, inner rings in said openings having oppositely disposed clamping jaws to grasp the outer faces of the pier, the other edges of said rings being also formed with clamping jaws, and rings on the outside of the tire body to co-operate with the last named clamping jaws to grasp the opposite faces of the side walls, all of said clamping jaws being aligned, whereby all of said parts at the inner face of the tire may be rigidly clamped together by the rim, the said pneumatic members also comprising filler rings resting upon the inner clamping rings.

6. In a device of the class described, a rim having securing means, a tire body having a pair of pneumatic members comprising two longitudinal channels the said channels being open at the rim, means by which the inner face of the tire body may be secured to the rim comprising inner rings having oppositely disposed inner clamping jaws to grip the interior part of the tire body and also having outer clamping jaws, and outer rings also comprising inner clamping jaws to co-operate with the last named clamping jaws of the other rings to grip the outer portions of the tire body these rings also being engaged by the securing means of the rim, all of the said jaws being aligned, whereby all of the said parts at the inner face of the tire may be rigidly clamped and held together by the securing means of the rim.

7. In a device of the class described, a rim, a tire body, means by which the inner face of the latter may be secured to the rim comprising two interior rings having oppositely disposed clamping jaws to grip the interior part of the tire body, and outer rings also having clamping jaws to co-operate with the other rings to grip the outer parts of the tire body, the three pairs of clamping jaws thus formed all engaging the tire body and being in alignment, whereby all of said parts may be rigidly clamped together by the rim, the said tire body also comprising a pair of longitudinal pneumatic members, the latter also comprising filler rings resting upon the said inner clamping rings.

Signed at New York, in the county of New York and State of New York, this 23rd day of October, A. D. 1920.

PETER T. LEHR.

In the presence of:—
PHILLIP J. ERNENWEIN,
CHRIS SCHLUSING.